United States Patent [19]

Meyers et al.

[11] Patent Number: 5,018,808
[45] Date of Patent: May 28, 1991

[54] METHOD AND APPARATUS FOR BEAM DISPLACEMENT IN A LIGHT BEAM SCANNER

[75] Inventors: Mark M. Meyers, Hamlin; James K. Lee, Brighton; Badhri Narayan, Rochester; James E. Roddy, Greece, all of N.Y.

[73] Assignee: Eastman Kodak Company, Rochester, N.Y.

[21] Appl. No.: 457,128

[22] Filed: Dec. 26, 1969

[51] Int. Cl.[5] ............................ G02B 26.08; H01J 5/16
[52] U.S. Cl. ..................................... 350/6.91; 350/6.4; 350/486; 250/235
[58] Field of Search .................. 350/3.71, 6.2–6.8, 350/486, 484, 6.91, 320; 250/234–236

[56] References Cited
U.S. PATENT DOCUMENTS

| | | | |
|---|---|---|---|
| 3,598,468 | 8/1971 | Perry | 350/55 |
| 3,752,559 | 8/1973 | Fletcher et al. | 350/55 |
| 4,172,259 | 10/1979 | Lowe | 346/110 R |
| 4,214,157 | 7/1980 | Check, Jr. et al. | 250/236 |
| 4,219,704 | 8/1980 | Russell | 179/100.3 |
| 4,268,110 | 5/1981 | Ford | 350/6.7 |
| 4,635,072 | 1/1987 | Conrads et al. | 346/1.1 |
| 4,755,876 | 7/1988 | Dangler | 358/264 |
| 4,779,944 | 10/1988 | Ritter et al. | 350/3.71 |
| 4,803,498 | 2/1989 | Aharon | 346/108 |
| 4,847,642 | 7/1989 | Murayama et al. | 346/157 |
| 4,873,435 | 10/1989 | One et al. | 350/6.91 |

OTHER PUBLICATIONS

Urbach et al., Laser Scanning for Electronic Printing, Proc. of the IEEE, vol. 70, No. 6, Jun. 1982, pp. 597–618.
IBM Technical Disclos. Bulletin, vol. 22, No. 9, Feb. 1980.

Primary Examiner—Bruce Y. Arnold
Assistant Examiner—James Phan
Attorney, Agent, or Firm—Mark Z. Dudley

[57] ABSTRACT

A method and apparatus is provided for line scanning a beam receiving member, wherein a scanning beam is angularly or laterally displaced to compensate for scan line spacing error. The beam is displaced according to error arising from variation (flutter) in the relative motion of the beam and the beam receiving member, or according to error arising from movement of the receiving member while the scanning beam travels to a start of scan position, or both. Embodiments of beam displacement means include a refracting tilt plate, a reflecting tilt plate, a diffracting tilt plate, and a tilt prism.

25 Claims, 5 Drawing Sheets

METHOD AND APPARATUS FOR BEAM DISPLACEMENT IN A LIGHT BEAM SCANNER

BACKGROUND OF THE INVENTION

1. Field of the Invention

This invention relates to light beam scanning methods and apparatus, and more specifically, to methods and apparatus for minimizing or eliminating the effects of scan line spacing error.

2. Description of the Prior Art

Many reproduction apparatus, such as electrostatographic printers or copiers, use a beam scanning process for exposure of a photosensitive member. Often called output scanning, the process provides for modulation of a light beam as the beam is moved relative to the surface of the photosensitive member. An image composed of scan line exposures is then provided. The image thus formed is developed and transferred to a receiver.

Image degradation occurs when the spacing of scan line exposures is non-uniform. Scan line spacing error creates a density banding effect, which is a visible and highly-objectionable variation in image density between recorded raster lines in the final print. The density banding may be sufficient to cause image degradation that is immediately visible in a monochromatic print.

If successive images are to be superposed on a single receiver to form a multicolor image, very precise registration of the images governs the quality of the multicolor image. Similarly, successive images may be individually used as color separation masters in a xeroprinting, lithoprinting, or other print-making apparatus, wherein the accuracy of image registration is often critical to final print quality. Scan line spacing errors in the various print layers of a composite multicolor print can produce undesirable color shifts and loss of detail.

Some scan line spacing error is attributable to a variation, or "flutter", in the transport speed of the photosensitive member. This variation is typically due to transport rate errors in the transport system for the photosensitive member. Nearly all types of electrophotographic copiers and printers experience some flutter due to friction or mechanical inaccuracy in the transport system. Another source of flutter is the drag imparted to the photosensitive member as it is acted upon by the toning, transfer, and cleaning stations.

Output scanners have been considered for use in replacing the exposure station of an optical input copier or printer. The conversion is difficult because the amount of tolerable flutter is inherently greater in an optical exposure station than in a scan exposure station. Optical input copiers generally flash expose the entire image frame in roughly one-tenth of a millisecond. A scanning exposure station, however, will write the image one pixel a time in numerous line scans to complete the image in roughly a second. Thus, a given amount of flutter that is acceptable in a flash exposure will cause undesirable image banding artifacts during a one-second scanning exposure.

Scan line spacing error in an output scanner also occurs due to imprecise timing of line exposures relative to the movement of the photosensitive member. Beam scanning must be coordinated with the speed and position of the photosensitive member and with the modulation, or illumination control, of the beam. Successive scans provided by a beam deflector construct an entire image on the web, but the web rotates asynchronously with respect to the location of the light beam on the scan line. Hence, when the web is in a position to receive the line scan exposure, the beam deflector may not be in the proper position for starting a scan line. The exposure must be delayed to allow the beam deflector to move to the requisite position for initiating a scan line. In the worst case, the beam deflector will have just passed the requisite position when the exposure is due. Significant misregistration of the exposure can then occur.

In U.S. Pat. No. 4,779,944, issued in the name of Ritter et al., an acousto-optical diffraction grating modulator is used to compensate for minor errors associated with a photosensitive member transport system. The modulator deflects a laser beam to compensate for positional errors associated with a xerographic drum rotation mechanism.

However, acousto-optical modulators can be relatively complex and expensive. An acousto-optical modulator typically requires a radio frequency generator which applies an amplified, high frequency signal to an acoustic transducer. The transducer then launches acoustic waves in the acousto-optical cell to create a diffraction wave grating. The radio frequency generator is subject to instability and requires frequent realignment of the amplitude and frequency of its output. Moreover, the rise time of an acousto-optical modulator is dependent upon the diameter of the modulated light beam. Hence, to achieve high speed from an acousto-optical modulator, it is necessary to reduce the dimension of the optical beam that is crossed by the acoustic wave. This reduction is undesirable, as additional beam-shaping optical components are then required to restore the beam to a proper condition.

SUMMARY OF THE INVENTION

Therefore, it an object of this invention to provide a beam scanner for providing line scanning wherein image banding and other effects of scan line spacing error are minimized.

It is also an object to provide a beam scanner for the replacement of a conventional exposure station in an optical copier or printer while inhibiting the effects of scan line spacing error and with minimal change to the existing photosensitive member transport.

These and other objects are accomplished in a method for beam scanning of a scan receiving member. A light beam is directed upon means operable by selective orientation for displacing the beam. The light beam is deflected so as to effect repeated line scanning of the scan receiving member and spacing is provided between sequential scan lines. The spacing of the scan lines is determined and the beam displacement means is selectably oriented in accordance with the determination of the scan line spacing error so as to displace the light beam to compensate for such error.

Also provided is an apparatus for scanning a light beam upon a scan receiving member which includes means for generating a light beam and means for displacing the light beam which is operable by selective orientation thereof. Means is provided for deflecting the light beam so as to effect plural line scanning of the scan receiving member. Means is provided for spacing sequential scan lines. Also included are means for determining scan line spacing error and means for selectably orienting the beam displacing means in accordance with the determination of the scan line spacing error so as to displace the light beam to compensate for such error. Preferred embodiments of the beam displacement means include a refracting tilt plate, a reflecting tilt plate, a diffracting tilt plate, and a tilt prism.

DETAILED DESCRIPTION OF THE INVENTION

Figures 1, 2:
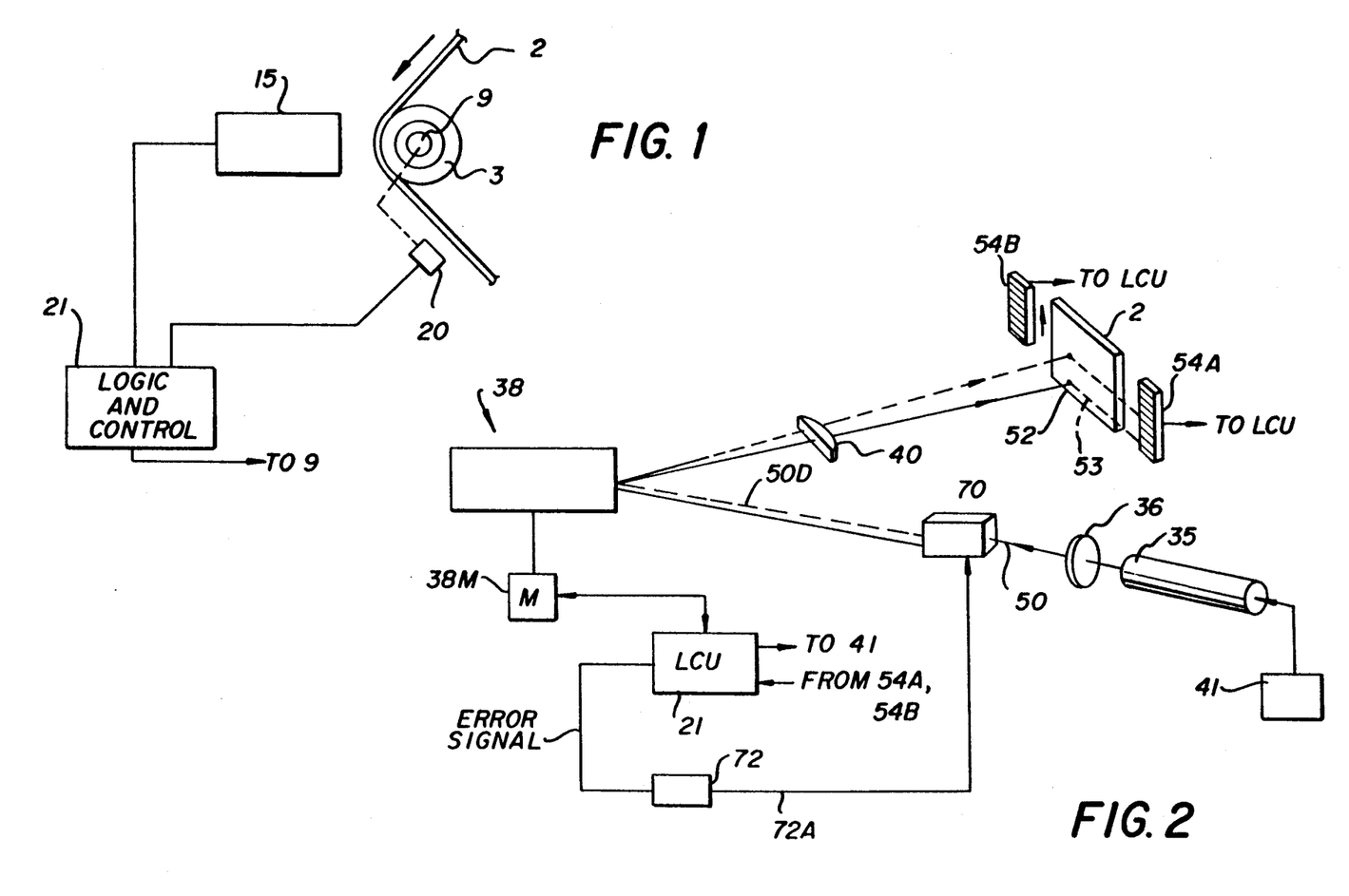
FIG. 1 is a schematic side view of a scanning exposure station constructed according to the present invention.
FIG. 2 is a simplified schematic view of an output scanner, for use in in the exposure station of FIG. 1, which includes a scan line spacing error compensation means operable according to the present invention.

According to FIG. 1, there is shown a light beam scanning apparatus 1 constructed according to the present invention. The apparatus 1 is preferably useable as a scanning exposure station in an electrophotographic reproduction apparatus.

A beam receiving member in the form of a photosensitive endless web 2 is trained about an image formation roller 3. A web transport means 9 causes the web 2 to travel past a beam source 15. Web travel is sensed by information supplied to a logic and control unit (LCU) 21 from an encoder 20 on the drive means 9. Web transport rate and position information can be provided by other known sensors and triggered by certain indicia. For example, conductive, magnetic or optically sensible indicia on the web 2 can be sensed by appropriate sensors to provide accurate web transport rate and position sensing. The output of the encoder 20 allows the LCU 21 to continuously calculate web transport rate and position for effecting control of the output scanner 15 and the drive means 9.

The web 2 may include one or more photoconductive layers, a conductive layer, and a support. The web 2 would first be charged, then exposed at the beam scanning apparatus 1 to create a latent electrostatic image thereon, and later developed and transferred to a receiver. Process stations appropriate for carrying out these tasks are well-known in the art and have been omitted from FIG. 1 for clarity.

The invention is particularly useful in an apparatus in which a receiver is to be used as a high-resolution monochromatic reproduction. The image content of such reproductions includes, for example, detailed maps, charts, and the like. The receivers may also be intended for use as color separation masters. Such masters may be used in xeroprinting, lithoprinting, or other similar apparatus to make multicolor reproductions according to the technologies of those apparatus. In another application of the invention, a composite multicolor reproduction may be provided wherein several latent images are developed with colored toners and superposed on one receiver. The development process thus uses toners of differing color, for example, cyan, magenta, yellow, and black.

However, this invention can be used in many known systems in which an image, latent or otherwise, is recorded by scan exposure of a photosensitive member. Such systems may include the printing, reproduction, or facsimile of images according to techniques in the graphic and photographic arts, data recording art, and radiographic art. Additionally, the beam scanning apparatus 1 can find use in displacement of a scanning beam in what are known as input scanners, wherein beam scanning is used for image reading and image transmission.

FIG. 2 is a more detailed view illustrating a preferred embodiment of the beam scanning apparatus 1 constructed according to the present invention. The beam source 15 of FIG. 1 includes a laser 35, a collimating lens 36, a beam deflector 38, a beam deflector drive motor 38M, and an F-$\Theta$ lens 40. The beam source 15 is preferably capable of fairly high image resolution, such as resolution of up to 800 dots per inch. The laser 35 is preferably a He-Ne laser or laser diode, and receives image data input from a computer, memory, or other image data producer 41. The image data represents one or more of the desired monochromatic images to be reproduced.

Pulses from the encoder 20 trigger a clock in the LCU 21 to provide for calculation of the web transport rate. Low frequency variations in the transport rate are corrected by phase-locking the speed of the motor 38M to the speed of the web transport means 9. High-frequency variations of the web transport rate speed are compensated according to the present invention, as will be described shortly.

The beam deflector 38 shown in FIG. 2 is illustrative of the invention and is simplified in the interest of clarity, and thus will not be described in detail herein. The illustrated beam deflector 38 may be provided by a rotating polygon, rotating holographic disc (hologon), or galvanometer mirror as is known in the art. Typically, the beam deflector is driven by motor 38M, as illustrated, so as to impart a linear scanning motion to the laser beam 50. The beam deflector 38 has one or more beam-deflecting facets, wherein an operative facet deflects the modulated light beam to cause the beam to trace a beam point 52 in a line scan 53. Preferably, the beam deflector 38 is driven at a constant angular velocity by the motor 38M.

The scan rate of the scanning beam is sensed by a pair of photoelectric sensors 54A and 54B, the outputs of which are monitored by clock circuitry in the LCU 21. The beam point 52 thus crosses sensor 54A at the start of scan and the sensor 54B at the end of scan. From the timing of the outputs received, the LCU 21 may calculate the beam position in the line scan. The LCU 21 controls scan line exposure by signalling the release of image data from the image data producer 41 to the laser 35 for modulation of the beam 50. The logic and control unit 21 thus initiates each in a plurality of scan exposures to create an image frame (an electrostatic image on the charged web 2).

For each scan exposure to take place, the beam 50 from the laser 35 is selectively modulated according to image data received by the laser 35 to provide imagewise exposure of the web 2. Hence, the laser 35 is modulated such that only during a portion of a selected line scan is the beam intensity sufficient to expose the photosensitive member. At other times the beam continues to be deflected (scanned) but the modulation is such that no exposure is effected. The modulation of the laser 35 is provided by associated electro-optical components and electrical circuitry within the laser 35. Although the modulation may be bilevel, or controlled about a lasing threshold, other forms of modulation may be used. For example, it is also within the contemplation of the invention that the laser beam amplitude be modulated to create different levels of beam intensity.

The scan exposures are spaced due to relative movement between the web 2 and the beam 50. The rate of relative movement which is considered the transport rate. Preferably, this movement is provided while the web 2 is continuously transported in the cross-scan direction. Alternatively, it is contemplated that the embodiment may be modified as is known in the art such that the web 2 is stationary and the beam 50 is moved in the cross-scan direction.

In the preferred embodiment, the transport rate of the moving web 2 is monitored to discern errors which would cause the scan line spacing to vary from a predetermined constant or set of constants. The LCU 21 includes known logic circuitry which compares the web transport rate to a predetermined calibrated constant to determine transport rate error (flutter). For example, the LCU 21 may include pulse counting logic, wherein one counter is connected to a crystal clock and another counter is connected to the encoder 20 on the web drive. If the counter outputs are found unequal, the web transport rate is known to have deviated from the predetermined constant.

Because the scanning of the laser beam is not synchronized with the movement of the web 2, it is highly possible that an operative facet of the beam deflector 38 may be at a position other than that required for initiation of a scan exposure. The web 2 then continues to travel while the beam deflector 38 rotates to provide a facet at the requisite position. This elapsed web travel, which contributes to scan line spacing error, is calculated by the LCU 21, according to the information received from the sensors 54A and 54B.

Scan line spacing error due to either the variation in the transport rate or the elapsed travel error, or both, is corrected by one of several preferred embodiments of a beam displacement system 70. The beam displacement system 70 is positioned in the path of the beam 50 so as to laterally or angularly displace the beam 50 in the cross-scan direction. The position of the displaced beam 50D is provided according to the aforementioned error calculations by a control signal to a driver 72. Suitable circuitry in the driver 72 translates the control signal to a drive signal on line 72A for driving the beam displacement system 70.

The control signal is in the form of, for example, a digitized code or an analog signal that indicates the requisite direction and amount of beam displacement. For example, if the transport rate increases, the control signal may indicate that the laser beam 50 is to be displaced in the direction of web travel to compensate. If the transport rate decreases, the control signal would indicate a displacement in the opposite direction.

Feedback control of the beam displacement system 70 is enhanced by providing horizontal segments in the start of scan sensor 54A and the end of scan sensor 54B. Such sensors 54A, 54B may be formed from stacked charge-coupled device (CCD) segments fixed on a support adjacent to the web 2, such that only one, or a few, of the segments are scanned at the start and end of each scan line. The sensors 54A, 54B thereby provide beam level information to the LCU 21.

Figure 3:
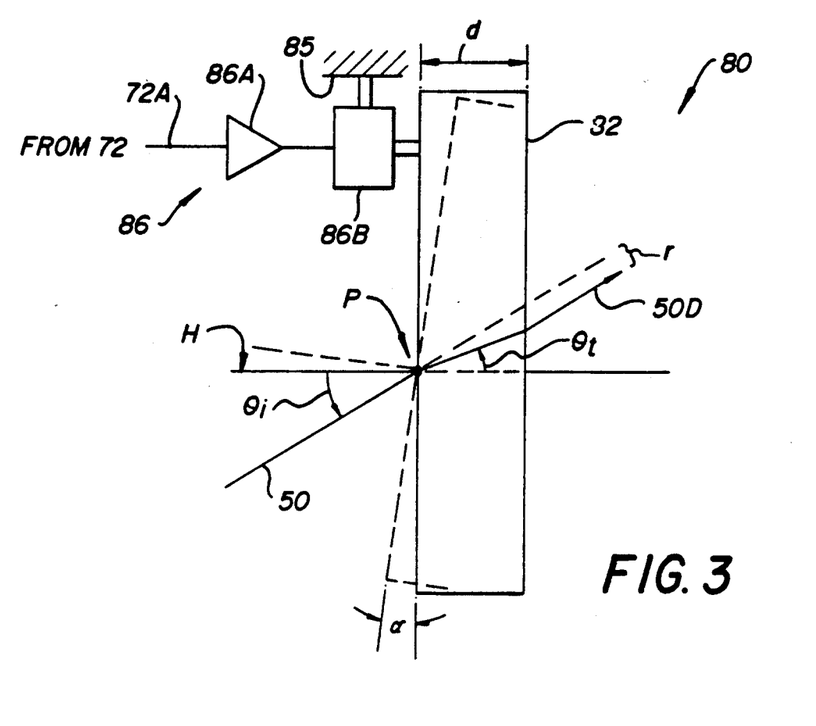
FIG. 3 is a side sectional view of a refracting tilt plate system for use in the scan line spacing error compensation means of FIG. 2.
Figures 4A, 4B:
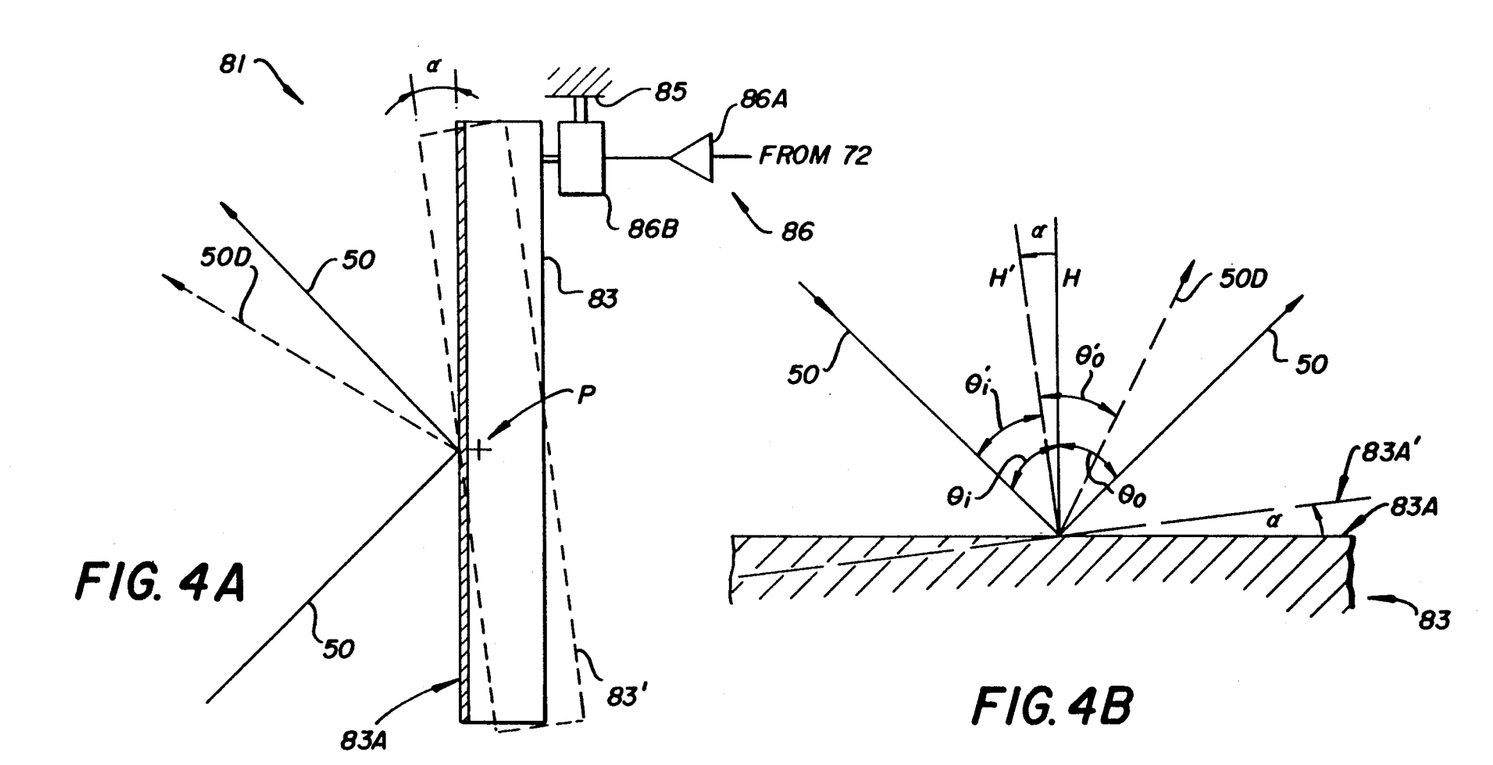
FIG. 4A is a side sectional view of a reflecting tilt plate system for use in the scan line spacing error compensation means of FIG. 2.
FIG. 4B is a schematic representation of the optical geometry of the reflecting tilt plate system of FIG. 4A.
Figures 5A, 5B:
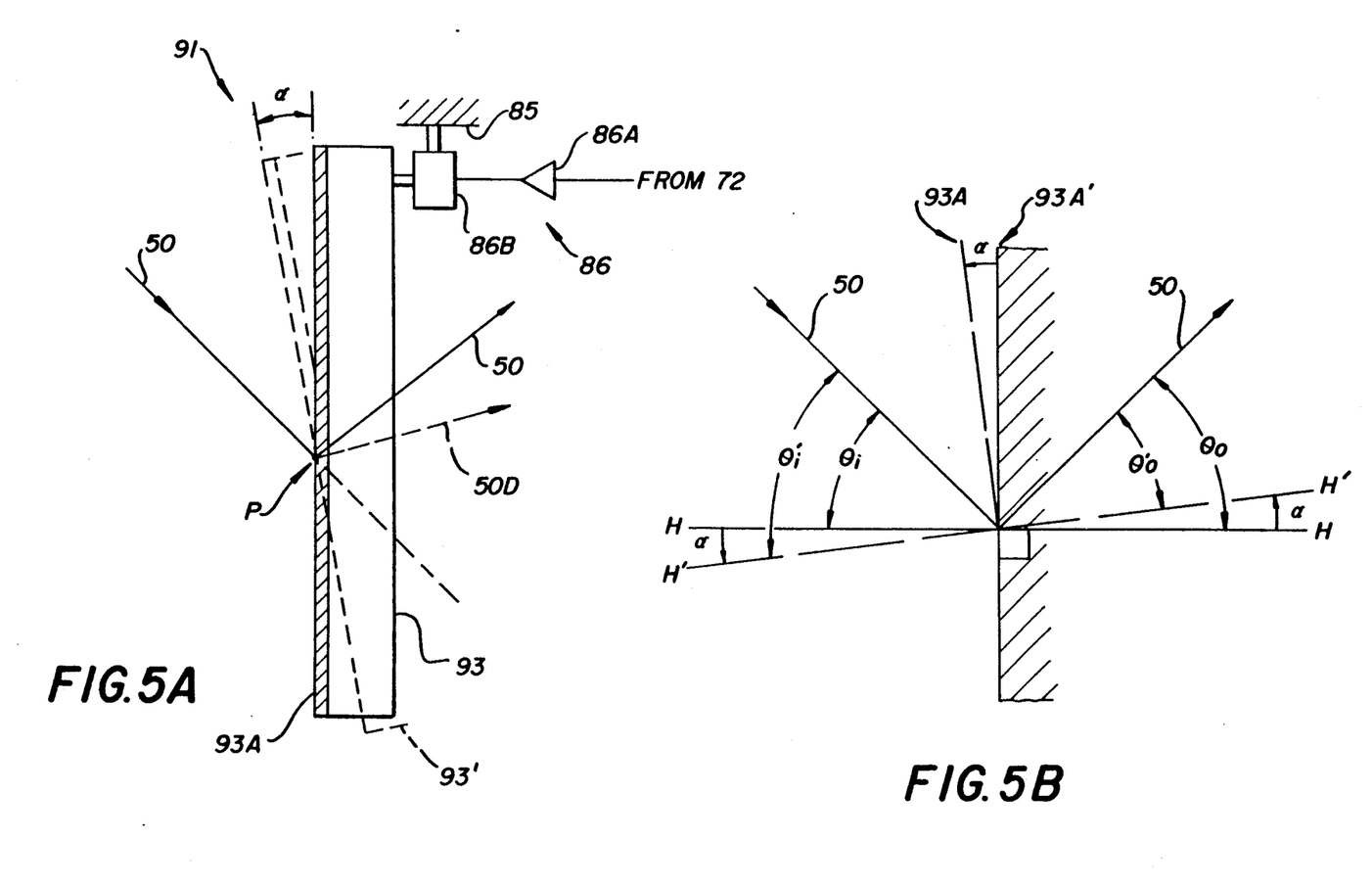
FIG. 5A is a side sectional view of a diffracting tilt plate system for use in the scan line spacing error compensation means of FIG. 2.
FIG. 5B is a schematic representation of the optical geometry of the diffracting tilt plate system of FIG. 5A.
Figure 6A:
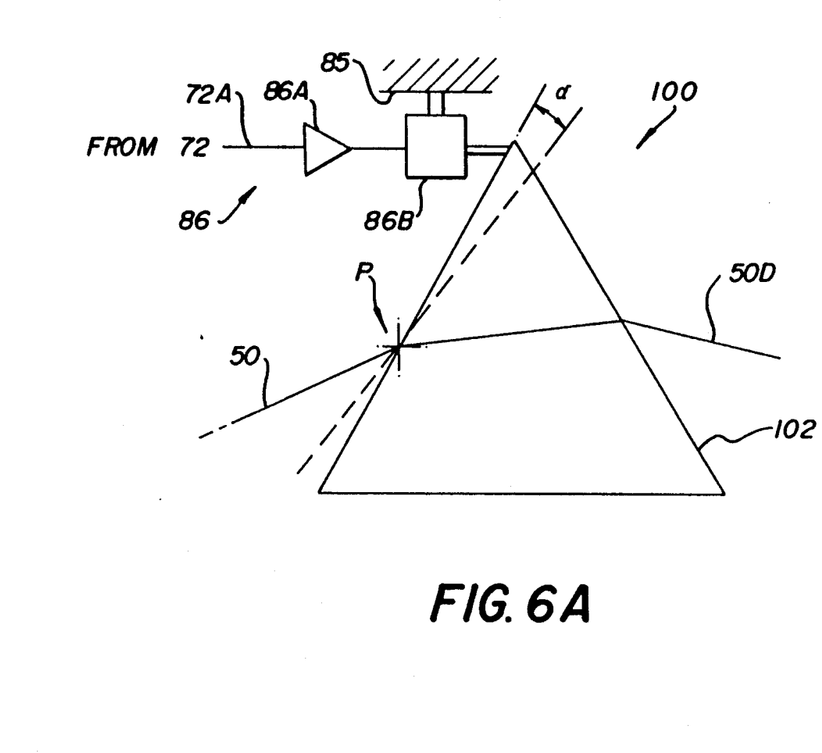
FIG. 6A is a side sectional view of a tilt prism system for use in the scan line spacing error compensation means of FIG. 2.

With reference now to FIGS. 3, 4A, 5A, and 6A, four preferred embodiments of the beam displacement system 70 of FIG. 2 will be described. The embodiments illustrated in FIGS. 4A, 5A, and 6A are preferably located in the beam 50 at a position between the collimating lens 36 and the beam deflector 38. The embodiment illustrated in FIG. 3 is preferably located in the beam 50 at a position after the F-$\Theta$ lens 40 and before the image plane of the web 2. An example of a displaced beam 50D with respect to the undisplaced beam 50 is illustrated in FIG. 2.

As shown in FIG. 3, a refracting tilt plate system 80 includes a refracting plate 82 of optically-transmissive material, such as optical glass, located in the path of the laser beam 50. The plate 82 is tiltable about an axis P that is parallel to the scan line. The refractive plate 82 has a uniform thickness d and two parallel, optically flat surfaces. The refracting plate 82 is supported about the pivot axis P by known means (not shown) connected to a supporting framework 85. An electromagnetic or piezoelectric actuator 86 is operable to effect a tilt $\alpha$. Upon being actuated by the drive signal from the driver 72, a programmable bias supply 86A excites a moveable portion of a piezoelectric or electromagnetic motor 86B attached to the refracting plate 82. The tilt $\alpha$ thus occurs as the motor 86B pushes or pulls due to the applied drive signal.

The incident beam 50 striking the refracting plate 82 is thereby incident at a input angle $\theta_i$ which varies as the plate position varies according to $\alpha$. The beam 50 is refracted and exits the refracting plate 82 parallel to its original direction but displaced laterally by an amount r. The displaced beam causes a corresponding displacement of the beam spot 52 (FIG. 2) in the cross-scan direction. The lateral displacement r is found according to the following relationships:

$$N_i \sin \theta_i = N_t \sin \theta_t$$

where
 $N_i$ = refractive index of incident media.
 $N_t$ = refractive index of transmitting media
and $$r = \frac{d \sin(\theta_i - \theta_t)}{\cos \theta_t}$$

where
 d = glass plate thickness,
 $\theta_i$ = angle of incidence,
 $\theta_t$ = angle of transmission,
 r = displacement.

FIG. 4A illustrates second preferred embodiment of the beam displacement system 70. The second embodiment is a reflecting tilt plate system 81 and includes some components similar to the components of the refracting tilt plate system 80. A reflecting tilt plate 83 is supported at a pivot axis P parallel to the scan line by known means (not shown) extending from the support 85. The reflective surface 83A of the plate 83 is preferably a planar silvered coating, although other surface treatments may be used. The plate 83 is tiltable to an extent $\alpha$ by the actuator system 86 as previously described with respect to the system 82 of FIG. 4A.

As shown in detail in FIG. 4B, the laser beam 50 strikes a reflective surface 83A of the plate 83 at an incident angle $\theta_i$ and is reflected at an output angle $\theta_o$. Both incident and output angles $\theta_i$, $\theta_o$ are measured from the normal H to the surface 83A. The normal H becomes normal H' as the plate 83 assumes a tilted position indicated in phantom as tilted plate 83' and tilted operative surface 83A'. The incident angle $\theta_i$ is equal to the output angle $\theta_o$ as given by Fermat's Principle for reflection.

Accordingly, in an instance requiring beam displacement, the LCU 21 provides an error signal to the driver 72 to drive the actuator 86. The resulting tilt $\alpha$ alters the incident angle $\theta_i$ to incident angle $\theta_i'$ and the output angle $\theta_o$ to output angle $\theta_o'$. The beam 50 is thus angularly displaced by an angular change $d\theta_o$ that is equal to twice the tilt angle $\alpha$.

FIG. 5A illustrates third preferred embodiment of the beam displacement system 70. The third embodiment is a diffracting tilt plate system 91 and includes some components similar to the components of the refracting tilt plate system 80. A diffracting tilt plate 93 is supported at a pivot axis P parallel to the scan line by known means (not shown) extending from the support 85. The plate 93 is a planar substrate having parallel surfaces with a linear diffraction grating is provided at the operative surface 93A. For clarity in illustration, the plate 93 is assumed to be optically-transmissive and surface 93A is assumed to have a transmission diffraction grating. However, as will be shown below, surface 93A may instead incorporate a reflection grating.

As shown in detail in FIG. 5B, the laser beam 50 strikes the operative surface 93A at an incident angle $\theta_i$ and is diffracted so as to be redirected at an output angle $\theta_o$. Both incident and output angles $\theta_i$, $\theta_o$ are measured from the normal H of the surface 93A. The plate 93 is tiltable to an extent $\alpha$ by the actuator system 86 as previously described with respect to the system 82 of FIG. 4A. The normal H becomes normal H' and the plate 93 assumes a tilted position indicated in phantom as operative surface 93A'.

The beam 50 may therefore be selectably diffracted as a tilt $\alpha$ is imparted by the actuator 86. $\theta_i$ and $\theta_o$ appear as $\theta'_i$ and $\theta'_o$ with the addition and subtraction of $\alpha$, respectively. As given in Beiser, L., *Holographic Scanning*, John Wiley, 1988, at p.99, the relationship between the change of output angle $d\theta_o$ due to changing tilt angle $d\alpha$ in a plane linear grating is:

$$d\theta_o = \pm \left[ 1 \mp \frac{\cos(\theta_i + \alpha)}{\cos(\theta_o \mp \alpha)} \right] d\alpha$$

which applies to both transmission and reflection gratings, with the upper sign used for transmission and the lower sign for reflection.

Now with reference to FIG. 6A, a fourth preferred embodiment of the beam displacement means 70 is shown. A tilt prism system 100 includes a tiltable prism 102 of optically-refractive material, such as optical glass, located in the path of the laser beam 50. The prism 102 is tiltable about a pivot axis P that is parallel to the scan line. The prism 102 is supported about the pivot axis P by known means (not shown) connected to a supporting framework 85. The actuator 86 provides a tilt $\alpha$ of the prism 102 upon receiving the drive signal from the driver 72.

Figure 6B:
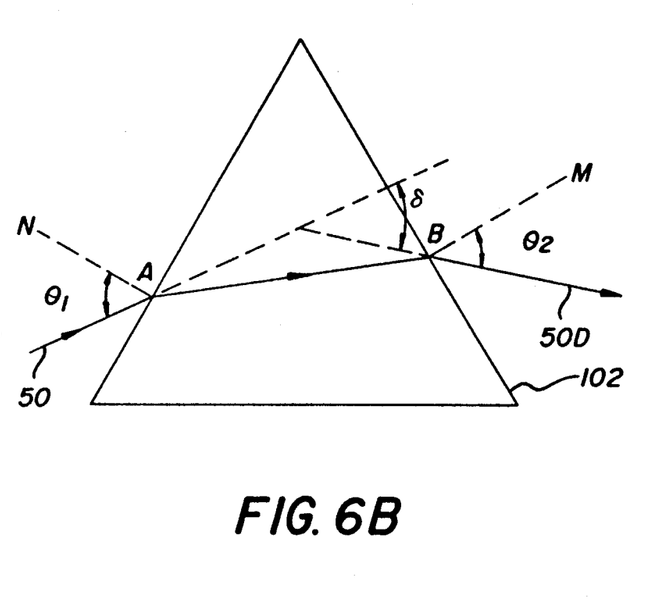
FIG. 6B is a schematic representation of the optical geometry of the tilt prism system of FIG. 6A.
Figure 7:
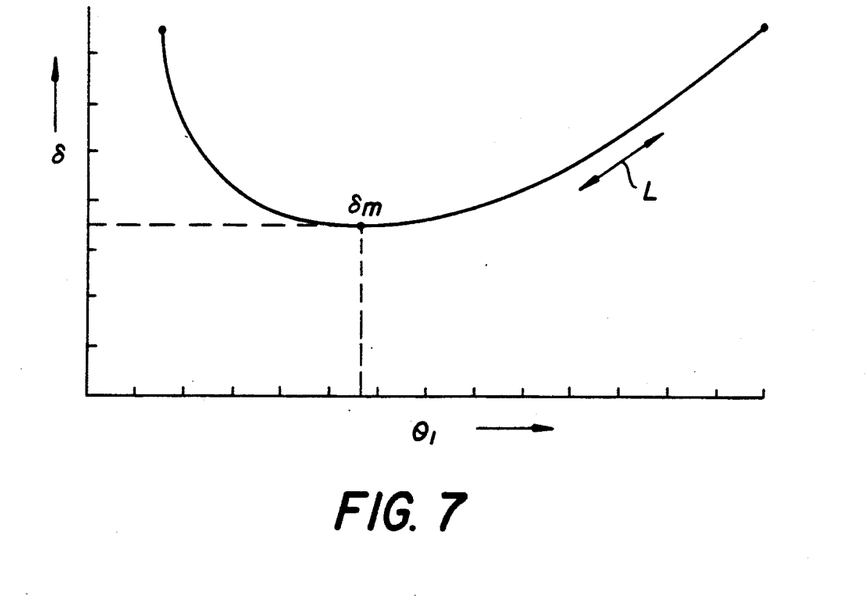
FIG. 7 is a graphical representation of the relation between tilt angle and output beam angle in the tilt prism system of FIG. 6A.

As shown in FIG. 6B, the beam 50 striking the prism 102 is thereby incident at an angle $\theta_1$ from the normal N, and emerges from the prism at an output angle $\theta_2$ from normal M. N and M are perpendicular to the prism faces at points A and B, respectively. As is known from classical optics, the prism 102 will refract the incident beam through an angle of deviation $\delta$. As the prism 102 is tilted continuously about the point A (which corresponds to the axis of pivot P in FIG. 6A), the angle of deviation $\delta$ will change about a minimum value $\delta_m$ as shown in FIG. 7. The tilt $\alpha$ of the prism is thus operated about a point on the curve away from the minimum condition $\delta_m$. For example, the tilt $\alpha$ may be provided in the region L where the response is fairly linear.

The invention has been described in detail with particular reference to preferred embodiments thereof, but it will be understood that variations and modifications can be effected within the spirit and scope of the invention as described hereinabove and as defined in the appended claims.

What is claimed is:

1. A method for beam scanning of a scan receiving member, comprising the steps of:
   directing a light beam upon means operable by selective orientation for displacing the beam;
   deflecting the light beam so as to effect repeated line scanning of the scan receiving member;
   providing spacing between sequential scan lines, the spacing being subject to error;
   determining the scan line spacing error; and
   selectably orienting the beam displacement means in accordance with the determination of the scan line spacing error so as to displace the light beam to compensate for such error.

2. The method of claim 1, further comprising the step of refracting the light beam directed upon the beam displacement means to provide lateral displacement of the beam.

3. The method of claim 1, further comprising the step of refracting the light beam directed upon the beam displacement means to provide angular displacement of the beam.

4. The method of claim 1, further comprising the step of reflecting the light beam directed upon the beam displacement means to provide angular displacement of the beam.

5. The method of claim 1, further comprising the step of diffracting the light beam directed upon the beam displacement means to provide angular displacement of the beam.

6. The method of claim 1, wherein the step of providing scan line spacing further comprises the step of providing relative motion in the cross-scan direction between the light beam and the scan receiving member so as to effect the spacing.

7. The method of claim 6, wherein the step of providing relative motion further comprises the step of transporting the scan receiving member.

8. The method of claim 6, wherein the step of determining scan line spacing error further comprises the steps of:
   determining the rate of the relative motion in the cross-scan direction;
   calculating the variation of the rate from a predetermined value; and
   determining the scan line spacing error in accordance with the calculated rate variation.

9. The method of claim 6, wherein the step of determining the scan line spacing error further comprises the steps of:
   determining the position of a portion of the scan receiving member selected for scanning;
   determining the position of a portion of the scan receiving member upon which the scanning will actually be made; and
   determining the scan line spacing error in accordance with the differential between the scan receiving member positions.

10. A method for scan line exposure of a photosensitive member, comprising the steps of:
    directing a laser beam upon means operable by selective orientation for displacing the laser beam;
    deflecting the laser beam so as to effect repeated line scanning of the photosensitive member;
    selectably modulating the laser beam to effect plural line scan exposures of the photosensitive medium;
    providing relative motion in the cross-scan direction between the photosensitive medium and the laser beam to effect spacing between sequential scan line exposures, the spacing being subject to error;
    determining the error in the spacing;
    generating an error correction signal; and
    selectably orienting the beam displacement means in accordance with the error correction signal so as to displace the laser beam to compensate for such error.

11. Apparatus for scanning a light beam upon a scan receiving member, comprising:
    means for generating a light beam;
    means for displacing the light beam, the means being operable by selective orientation thereof;
    means for deflecting the light beam so as to effect plural line scanning of the scan receiving member;
    means for providing spacing between sequential scan lines;
    means for determining scan line spacing error; and
    means for selectably orienting the beam displacing means in accordance with the determination of the scan line spacing error so as to displace the light beam to compensate for such error.

12. The apparatus of claim 11, wherein the beam displacement means further comprises means for refracting the light beam to provide lateral displacement of the beam.

13. The apparatus of claim 11, wherein the beam displacement means further comprises means for refracting the light beam to provide angular displacement of the beam.

14. The apparatus of claim 11, wherein the beam displacement means further comprises means for reflecting the light beam to provide angular displacement of the beam.

15. The apparatus of claim 11, wherein the beam displacement means further comprises means for diffracting the light beam to provide angular displacement of the beam.

16. The apparatus of claim 11, wherein the means for providing scan line spacing further comprises means for providing relative motion in the cross-scan direction between the light beam and the scan receiving member so as to effect the spacing.

17. The apparatus of claim 16, wherein the means for determining scan line spacing error further comprises:
    means for determining the rate of the relative motion in the cross-scan direction;
    means for calculating the variation of the rate from a predetermined value; and
    means for determining the scan line spacing error in accordance with the calculated rate variation.

18. The apparatus of claim 16, wherein the means for determining the scan line spacing error further comprises:
    means for determining first and second positions of the scan receiving member, the first position being that selected for receiving a scan line and the second position being that upon which the scan line will actually be received; and
    means for determining the scan line spacing error in accordance with the differential between the first and second positions.

19. Apparatus for scan line exposure of a photosensitive member, comprising:
    means for generating a laser beam;
    means for displacing the laser beam operable by selective orientation thereof;
    means for modulating the laser beam so as to effect exposure of the photosensitive member during selected ones of the line scans;
    means for deflecting the modulated laser beam so as to effect plural line scanning of the photosensitive member;
    means for providing relative motion in the cross-scan direction between the photosensitive member and the laser beam so as to effect a spacing of the scan line exposures, the exposure spacing being subject to error;
    means for determining the spacing error and for generating a spacing error correction signal; and
    means for selectably orienting the beam displacement means in accordance with the error correction signal so as to displace the light beam to compensate for the exposure spacing error.

20. The scanning exposure station of claim 19, wherein the beam displacement means further comprises a movable refracting tilt plate selectably oriented in the beam path for refraction of the laser beam incident at a face thereof to effect lateral displacement of the laser beam.

21. The scanning exposure station of claim 19, wherein the displacement means further comprises a moveable tilt prism selectably oriented in the beam path for refraction of the laser beam incident at a face thereof to effect angular displacement of the laser beam.

22. The scanning exposure station of claim 19, wherein the displacement means further comprises a moveable reflecting tilt plate selectably oriented in the beam path for reflection of the laser beam incident at a face thereof to effect angular displacement of the laser beam.

23. The scanning exposure station of claim 19, wherein the displacement means further comprises a moveable diffracting tilt plate selectably oriented in the beam path for diffraction of the laser beam incident at a face thereof to effect angular displacement of the laser beam.

24. The apparatus of claim 19, wherein the means for determining scan line spacing error further comprises:
- means for determining the rate of the relative motion;
- means for calculating the variation of the rate from a predetermined value; and
- means for determining the scan line spacing error in accordance with the calculated rate variation.

25. The apparatus of claim 19, wherein the means for determining the scan line spacing error further comprises:
- means for determining first and second positions of the photosensitive member, the first position being that selected for receiving exposure and the second position being that upon which the exposure will actually be received; and
- means for determining the scan line spacing error in accordance with the differential between the first and second positions.

* * * * *

UNITED STATES PATENT AND TRADEMARK OFFICE
CERTIFICATE OF CORRECTION

PATENT NO. : 5,018,808

DATED : 05/28/91

INVENTOR(S) : Mark M. Meyers, et al

It is certified that error appears in the above-identified patent and that said Letters Patent is hereby corrected as shown below:

On the title page, item [22] Filed: should read as follows;

Dec. 26, 1989

Signed and Sealed this
First Day of December, 1992

*Attest:*

DOUGLAS B. COMER

*Attesting Officer*      *Acting Commissioner of Patents and Trademarks*